May 7, 1963     J. F. MENKE     3,088,988
ELECTRICAL POWER SOURCE FOR ROCKETS
Filed Dec. 22, 1958     2 Sheets-Sheet 1

May 7, 1963 J. F. MENKE 3,088,988
ELECTRICAL POWER SOURCE FOR ROCKETS
Filed Dec. 22, 1958 2 Sheets-Sheet 2

3,088,988
ELECTRICAL POWER SOURCE FOR ROCKETS
Joseph F. Menke, Heidelberg, Germany, assignor to Eltro Gesellschaft für Strahlungstechnik m.b.H., Heidelberg, Germany
Filed Dec. 22, 1958, Ser. No. 782,003
Claims priority, application Germany Feb. 13, 1958
3 Claims. (Cl. 136—4)

This invention relates to rockets and more particularly to means for providing electrical power sources for the same.

Modern rockets include electrical circuits requiring sources of electrical power for operation. It is conventional to employ for these rockets batteries of various types which, in known manner, due to chemical reactions and the like, provide electrical power. Batteries, unfortunately, have a limited life and are not always dependable. They are responsive to ambient conditions for being rendered ineffective or inefficient. Moreover, the space requirements of batteries are frequently excessive and batteries are frequently of such weights as to necessitate special consideration.

It is an object of the invention to provide improved means whereby a source of electrical power is provided for the electrical circuits of a rocket, the source of power being provided without having recourse to the use of batteries.

It is a further object of the invention to provide an improved source of power for use in rockets, the improved source being very reliable and not subject to the conditions which cause batteries to malfunction.

A further object of the invention is to provide a source of electrical power for rocket circuits which source requires no special considerations as regards weight and the like.

In the functioning of a rocket substantial amounts of energy are generated which are not usefully employed. Batteries and conventional sources of electrical power make no use of this surplus energy and in fact are sometimes deleteriously affected thereby.

Accordingly, it is a further object of the invention to provide means whereby this surplus energy is converted into electrical power.

Briefly, the invention contemplates that heat is generated for and during rocket flight, which heat is in excess of that required for rocket flight or is incidental thereto and that heretofore this surplus heat has served no useful purpose. The invention contemplates the utilization of this heat by the use of transducing means which converts this surplus heat into useful electrical power which is employed for purposes of operating electrical or electronic equipment incorporated into the associated rocket.

One form of surplus heat occurs in the combustion chamber of the rocket wherein an excess of heat is commonly generated which serves no useful purpose. The invention contemplates that transducer devices such as thermocouples be operatively disposed with respect to this excess of heat in order to generate electrical power for utilitarian purposes.

Furthermore, it is contemplated in accordance with the invention that the "skin heat" generated in the outer wall of a rocket, as a result of its flight through the atmosphere, be similarly converted into useful electrical power.

It will be appreciated that the heat generated in a combustion chamber is normally at a maximum at the beginning of flight for purposes of obtaining the initial thrust and that the heat in the combustion chamber declines during and towards the end of flight. In contrast thereto, the heat in the skin of the rocket increases to a maximum during and toward the end of flight so that this latter heat can be used to supplement the initial heat of the combustion chamber to provide a continuously available source of electrical power.

It is to be understood that the above reference to rockets as well as subsequent references to rockets is intended to include like devices in which there are excessive sources of heat not heretofore applied in a useful manner. For example, the invention is applicable in jets and like mechanisms wherein sources of heat which were heretofore wasted may be gainfully employed for purposes of generating electrical power.

A preferred embodiment of the invention will next be explained in greater detail with reference to the accompanying drawing in which.

Figure 1:
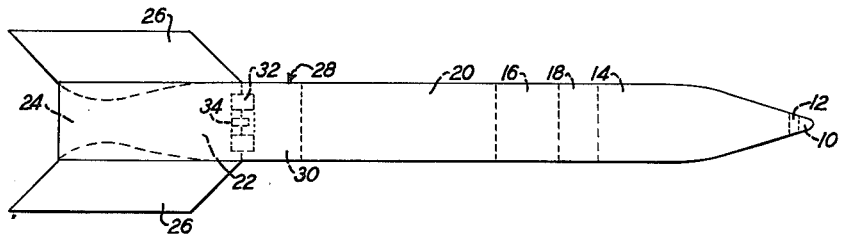
FIG. 1 is a diagrammatic view of a rocket, in section, illustrating the conventional sections thereof and further indicating a source of electrical power provided in accordance with the invention.
Figure 3:
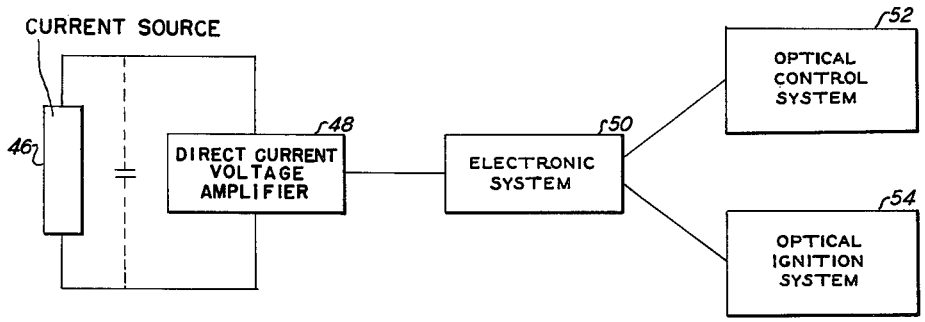
Figure 4:
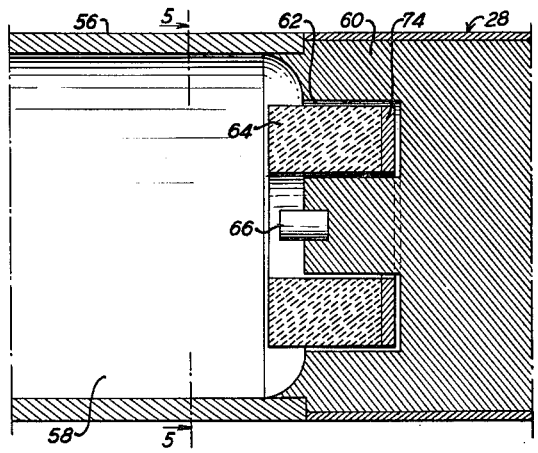
Figures 5, 6:
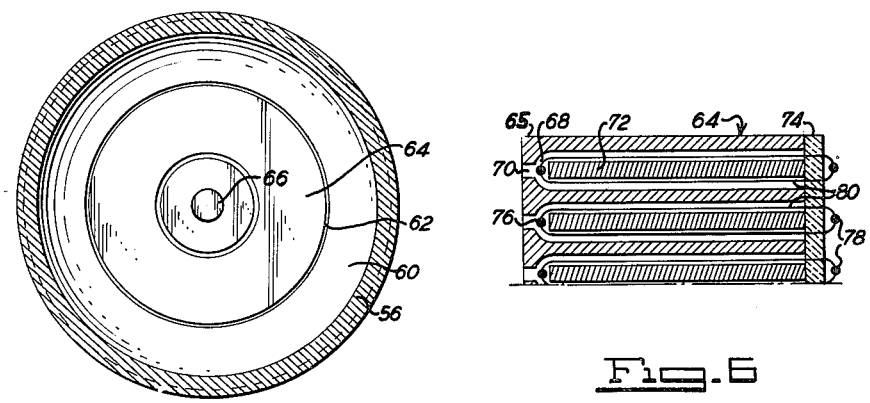

FIG. 3 diagrammatically illustrates the simple circuitry required for purposes of usefully employing the electrical power generated by the aforenoted transducers;

FIG. 4 is an enlarged sectional view of a portion of the rocket illustrated in FIG. 1, the view indicating the provisions made for converting heat in the combustion chamber to electrical power;

FIG. 5 is a transverse section of the structure shown in FIG. 4, the view being taken along line 5—5; and FIG. 6 is a radial section of a detail of the structure illustrated in FIG. 4, the view illustrating the housing of the transducer elements incorporated into this section.

Figure 2:
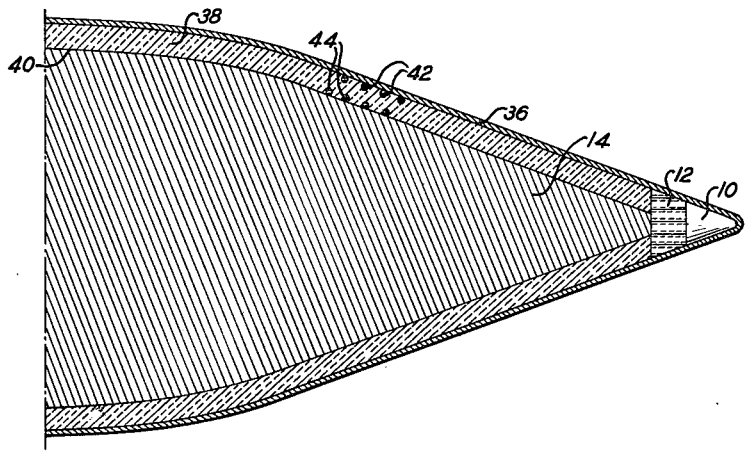
FIG. 2 is an enlarged sectional view of the nose portion of the rocket of FIG. 1, illustrating the positioning of transducers for purposes of converting the heat generated in the nose portion of the rocket to electrical power.

The rocket shown in FIGS. 1 and 2 comprises an impact fuse 10 of conventional type as well as an optical control system 12 which, for example, may be a conventional proximity system or conventional radar or infra-red ray system of the type generally employed to home a rocket on a target. The impact fuse is not a part of the instant invention, nor is the element 12, other than for the fact that this latter element generally provides control signals which are transmitted to an electronic circuit for purposes of controlling the flight of the rocket or the operation thereof. The details of optical system 12 are not important to an understanding of the invention and consequently these details are not illustrated herein.

The rocket further conventionally comprises an explosive charge 14 and chambers 16 and 18 which respectively house electron control circuits for the control of rocket flight and ignition circuits for controlling, for example, the ignition of explosive charge 14.

To the rear of chamber 16 may be positioned a fuel tank 20 of conventional type for housing fuels of conventional type. Operatively associated with fuel tank 20 is the conventional apparatus for rendering the same effective. To the rear of the rocket is a combustion chamber 22 of conventional type, the combustion chamber being provided with a discharge opening 24 by means of which the expulsion of expanding gases exerts a thrust on the rocket which propels the latter. The rear of the rocket is, moreover, provided with fins or guide means 26 in conventional manner.

In accordance with one aspect of the invention there is provided a section generally indicated by reference numeral 28 which is positioned adjacent the combustion chamber 22 and which has the function of converting heat generated therein into electrical power. This section, which will hereinafter be described in greater detail, consists generally of a closure member 30 supporting a transducer housing 32 and including an ignition device 34.

Referring next particularly to FIG. 2, a further provision of the invention, for converting heat into useful electrical power, is shown. In addition to impact fuse 10, optical control system 12 and explosive charge 14, the structure in FIG. 2 comprises a skin or outer wall 36, insulating wall 38 which is of a heat insulating material, and a boundary 40 between wall 38 and explosive charge 14.

Generally speaking, the invention contemplates making use of the heat of friction generated in the nose portion of the skin of the rocket and for this purpose the invention contemplates the use of transducers such as thermocouples. These thermocouples operate most efficiently with certain of their elements or junctions exposed to heat and other of their elements or junctions shielded therefrom. In other words, a temperature gradient need be provided across a thermocouple to cause it to work. Accordingly, FIG. 2 indicates elements 42 positioned immediately beneath skin 36 of the rocket, elements 42 constituting those which are to be subjected to the higher range of temperature. FIG. 2 further illustrates elements 44 positioned on the other side of insulating wall 38, the elements 44 being those which are to be subjected to the lower range of temperatures.

It is therefore clear how a temperature gradient is provided between elements 42 and 44 for purposes of providing for the operation of a thermocouple.

FIG. 3 is a block diagram of connections showing how the source of power provided for in accordance with the invention is usefully employed. In FIG. 3, power source 46 represents the combined effects of the transducers or thermocouples referred to above. Operatively associated with source 46 is a direct current voltage amplifier 48 which may be a conventional transistor amplifier which amplifies the low voltage provided by the thermocouples to a magnitude which is suitable for operating the electronic system 50. The electronic system 50 is controlled conventionally by the optical control system 52 and in turn controls the optical ignition system 54 in a manner conventional per se.

In fact, the use of conventional transducers or thermocouples generates a voltage having the order of magnitude of two volts. Amplifier 48 is employed to raise this magnitude to 150 volts or thereabout. A load capacity for power source 46 may be in the order of about 0.1 of a watt. This, however, depends upon the number of thermocouples employed and on the time and temperature of combustion, as well as skin heat. This magnitude of capacity has been found quite suitable for operating electronic equipment of the type generally employed.

FIG. 4 illustrates a diametral section of the portion of the rocket structure indicated by reference numeral 28 in FIG. 1. In FIG. 4, cylindrical wall 56 indicates the wall of a combustion chamber 58. The combustion chamber 58 is bounded towards the front of the rocket by a closure member 60 which is a massive plug of aluminum or like material having substantial mechanical strength while also being able to retain and conduct heat. Closure member 60 is provided with, for example, an annular groove 62 in which is housed a massive cylindrical element 64 which is preferably a ceramic for purposes of resistance to extreme temperatures and for purposes of retaining heat. In the center of the closure member 60 is provided an ignition device 66 which forms no part of this invention and is conventional per se for purposes of igniting, for example, solid fuel.

As shown in FIG. 6 which illustrates, in part, a radial sectional view of ceramic body 64, the ceramic body is developed in the form of a nozzle. It is provided with walls 65 enclosing chambers 68 which open into the combustion chamber via openings 70. In chambers 68 are positioned additional walls 72 which constitute supports and separating members for the transducer devices. The forward end of body 64 is bounded by a wall 74 of insulating material. This insulating material is intended to insure a temperature gradient between those elements of the transducers which are to be respectively subjected to higher and lower temperature ranges. Transducer elements are indicated in the form of junctions 76 positioned adjacent openings 70 for purposes of being subjected to the higher ranges of temperature and junctions 78 which are supported on the opposite side of wall 74 for purposes of their being subjected to lower ranges of temperatures. These junctions are connected in conventional manner by wires 80. It is to be noted that various types of conventional thermocouples can be employed. However, iron-constantan, nickel-chromium/nickel and platinum-rhodium/platinum thermocouples are especially suited for this purpose. It has been found sufficient for fulfilling the above noted parameters to employ approximately 130 thermocouples in ceramic body 64 although this number can be varied substantially in accordance with the requirements of the associated electronic circuitry.

It has been found useful at times to cover junctions 76 with a thin vitreous film or membrane which is quite pervious to heat radiation. For example, quartz and siliceous glasses may be employed as well as various special glasses which permit the passage of heat while effecting a conservative heat shielding function. This cover (not shown) decreases the rate of generation of voltage however and should be employed only if there is danger if the thermocouples might be damaged by the intensive jets of flame.

In operation, the heat generated in combustion chamber 22 incidental to providing a propulsion thrust for the rocket, heats the thermocouples including junctions 76 and 78 and causes the generation of electrical power. This power is converted to a desirable voltage magnitude by transformer 48 and is applied to the electronic system 50 which is controlled in conventional manner by, for example, optical control system 52.

During flight, heat generated in the skin or outer wall 36 of the nose portion of the rocket or any other selected portion, is employed to create a temperature gradient between elements 42 and 44 of the thermocouples in the nose of the rocket. The obtaining of the gradient is assisted by the utilization of insulating wall 38. It will be appreciated that the temperature of the nose of the rocket increases while the temperature of the combustion chamber 22 decreases so that the electrical power generated in these respective regions can be used to supplement one another throughout a complete rocket flight. Thus, in accordance with the invention, there has been provided a source of electrical power which obviates all of the aforenoted difficulties with respect to batteries and the like, the improvements of the invention efficiently making use of heat which was heretofore wasted.

There will now be obvious to those skilled in the art many modifications and variations of the methods, structures and apparatus set forth above. These modifications and variations will not, however, depart from the spirit of the invention as defined in the following claims.

What is claimed is:

1. A rocket structure comprising means defining a combustion chamber and means adjacent and constituting one limit of said chamber, the second said means comprising a massive cylindrical ceramic body provided with a plurality of annular concentric grooves opening into said chamber in the form of nozzles, annular walls in said grooves, first thermocouple elements supported on said walls in said grooves and second thermocouple elements supported on said body with the body being interposed between said second elements and said chamber, said body constituting a heat reservoir whereby said elements operate substantially independently of the heat in said chamber; and utilization means connected to said elements.

2. A rocket structure comprising means defining a combustion chamber and means adjacent and constituting one limit of said chamber; the second said means comprising a massive cylindrical ceramic body provided with a plurality of annular concentric grooves opening via restricted openings into said chamber, thermocouple elements in said grooves, said elements comprising sections adapted for being subjected to higher and lower temperatures respectively, said body including an insulation wall between said sections, the higher temperature sections lying wholly within said body and being exposed through said restricted openings to said chamber, said body constituting a heat reservoir whereby said elements operate substantially independently of the heat in said chamber; and utilization means connected to said elements.

3. A structure as claimed in claim 2 comprising a vitreous film on said elements.

References Cited in the file of this patent

UNITED STATES PATENTS

| | | |
|---|---|---|
| 1,118,269 | Creveling | Nov. 24, 1914 |
| 2,031,968 | Mathias | Feb. 25, 1936 |
| 2,519,241 | Findley | Aug. 15, 1950 |
| 2,536,464 | Ray | Jan. 2, 1951 |
| 2,711,629 | Schapker | June 28, 1955 |
| 2,791,963 | Schuler et al. | May 14, 1957 |
| 2,799,136 | De Boisblanc | July 16, 1957 |
| 2,800,081 | Kroeger et al. | July 23, 1957 |
| 2,807,209 | Kennard | Sept. 24, 1957 |

OTHER REFERENCES

"Missiles and Rockets" publication entitled "Sun to Cool Spaceship Electronic Components," by Raymond M. Nolan, dated Oct. 13, 1958. Pages 39 and 40 relied on.

"Fundamentals of Electron Devices and Circuits" (Weed and Davis), published by Prentice-Hall (Englewood Cliffs, N.J.), 1959 (page 545 relied upon).